United States Patent
Day et al.

(10) Patent No.: US 7,296,189 B2
(45) Date of Patent: Nov. 13, 2007

(54) METHOD, APPARATUS AND COMPUTER PROGRAM PRODUCT FOR IMPLEMENTING AUTONOMIC TESTING AND VERIFICATION OF SOFTWARE FIX PROGRAMS

(75) Inventors: Paul Reuben Day, Rochester, MN (US); Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 10/664,553

(22) Filed: Sep. 19, 2003

(65) Prior Publication Data

US 2005/0066233 A1    Mar. 24, 2005

(51) Int. Cl.
*G06F 11/00* (2006.01)
(52) U.S. Cl. .......................................... 714/38; 714/25
(58) Field of Classification Search .................. 714/25, 714/38, 46; 717/121
See application file for complete search history.

(56) References Cited

U.S. PATENT DOCUMENTS

| | | | | |
|---|---|---|---|---|
| 5,371,883 A | * | 12/1994 | Gross et al. ................... 714/38 |
| 5,615,333 A | * | 3/1997 | Juettner et al. ................ 714/38 |
| 5,651,111 A | * | 7/1997 | McKeeman et al. .......... 714/38 |
| 5,657,438 A | * | 8/1997 | Wygodny et al. .............. 714/1 |
| 5,901,225 A | * | 5/1999 | Ireton et al. .................... 714/7 |
| 6,823,478 B1 | * | 11/2004 | Prologo et al. ................ 714/38 |
| 7,146,536 B2 | * | 12/2006 | Bingham et al. .............. 714/26 |
| 7,185,332 B1 | * | 2/2007 | Waldin et al. ............... 717/170 |
| 2004/0088142 A1 | * | 5/2004 | Ashley et al. ............... 702/184 |
| 2004/0123187 A1 | * | 6/2004 | Colyer ......................... 714/38 |

* cited by examiner

*Primary Examiner*—Scott Baderman
*Assistant Examiner*—Joshua Lohn
(74) *Attorney, Agent, or Firm*—Joan Pennington

(57) ABSTRACT

A method, apparatus and computer program product are provided for implementing autonomic testing and verification of software fix programs or program temporary fixes (PTFs). A software fix program including multiple patches or a program temporary fix (PTF) including multiple programs is received. Each patch or program of the multiple patches or multiple programs of the software fix program or PTF is sequentially applied to a software product. The software product is tested responsive to each sequentially applied patch or program. Then next iterations or different combinations of patches or programs are sequentially applied to a software product and then the software product is tested responsive to each of the applied iterations.

21 Claims, 6 Drawing Sheets

METHOD, APPARATUS AND COMPUTER PROGRAM PRODUCT FOR IMPLEMENTING AUTONOMIC TESTING AND VERIFICATION OF SOFTWARE FIX PROGRAMS

FIELD OF THE INVENTION

The present invention relates generally to the data processing field, and more particularly, relates to a method, apparatus and computer program product for implementing autonomic testing and verification of software fix programs.

DESCRIPTION OF THE RELATED ART

After a software product is released, the producer may provide interim updates or fixes for the software product before the next release of the software product. These updates or fixes between releases may be referred to as program temporary fixes (PTFs).

On some systems, program temporary fixes (PTFs) may be sent out to customers as group PTFs or fix packs. These fix packs often contain multiple PTFs. At times a PTF is shipped which resolves one problem but introduces another problem. It can be extremely difficult to isolate which PTF causes the new problem, and the usual approach is for a programmer to debug the new problem for the overall software product.

Another layer of complexity is that a single PTF will often contain multiple programs and/or service programs. For example, on an IBM eServer iSeries® system, one PTF contained seven programs and one service program. It would save many hours of support and debug time if one could quickly isolate which program or service program within a PTF introduced the new problem.

Another layer of complexity on the IBM iSeries system, and which may be typical of other systems, is that when a PTF is applied to the system and then superseded by another PTF applied later, the first PTF may be forced to the permanently applied state as opposed to temporarily applied state. Also PTFs are applied permanently for many other reasons. Once a PTF is permanently applied, there is no easy way to temporarily remove the PTF to verify if the problem goes away when that PTF is removed.

Another complexity is that some PTFs are marked as delayed, meaning that an initial program load (IPL) or reboot may be required to apply them. Removing and re-applying the PTFs marked as delayed may require one or more IPLs of the system, which is very time consuming and prohibitive.

In addition to customer environments, these same situations are encountered on test machines in the development laboratories, such as when groups of these PTFs are applied for group testing, or when a few PTFs are applied for pre-group test. Even in these test environments when only a few PTFs are applied, it is difficult and time consuming to isolate problem PTFs and each problem program within these PTFs.

A need exists for a mechanism to autonomically isolate problems resulting from PTFs and further isolate programs within these PTFs that cause the problems. Such a mechanism could save significant time in both laboratory environments and customer support environments.

SUMMARY OF THE INVENTION

One aspect of the present invention is to provide a method, apparatus and computer program product for implementing autonomic testing and verification of software fix programs. Other important aspects of the present invention are to provide such method, apparatus and computer program product for implementing autonomic testing and verification of software fix programs substantially without negative effect and that overcome many of the disadvantages of prior art arrangements.

In brief, a method, apparatus and computer program product are provided for implementing autonomic testing and verification of software fix programs or program temporary fixes (PTFs). A software fix program including multiple patches is received. Each patch of the multiple patches of the software fix program is sequentially applied to a software product. The software product is tested responsive to each sequentially applied patch.

In accordance with features of the invention, after all of the multiple patches or programs of a program temporary fix (PTF) have been applied to the software product, then next iterations of different combinations of the patches or programs are sequentially applied to a software product and the software product is tested responsive to each applied iteration.

In accordance with features of the invention, an isolation manager is provided for receiving the software fix program or PTF and for sequentially applying each patch or program of the multiple patches or programs of the PTF to the software product. A user interface is coupled to the isolation manager for receiving user input selections and reporting results to the user. A software fix program or PTF or a group of software fix programs or PTFs are input to the isolation manager.

In accordance with features of the invention, responsive to a manual isolation user option, the isolation manager applies a program of the multiple programs of the PTF to a software product, notifies the user of the program applied to the software product, and waits for a user option of next or done. When the next user option is received, then the isolation manager applies a next program of the multiple programs of the PTF to a software product, notifies the user of the program applied to the software product, and waits for a user option of next or done.

In accordance with features of the invention, responsive to an autonomic isolation user selection, a test program is input to the isolation manager and expected test results are input to the isolation manager. Each program of the multiple programs of the PTF and iterations of different combinations of the programs are sequentially applied to the software product and the isolation manager calls the test program. The isolation manager compares test results with the expected test results and notifies the user when the test results are different from the expected test results.

In addition, as another option, in accordance with features of the invention, a test program is input to the isolation manager and expected test results are not input. Each program of the multiple programs of the PTF and iterations of different combinations of the programs are sequentially applied to the software product and the isolation manager calls the test program. The isolation manager saves the test results in a results table and displays the results to the user. Auto analysis of the test results includes comparing all results to each other result for identifying a problem program.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
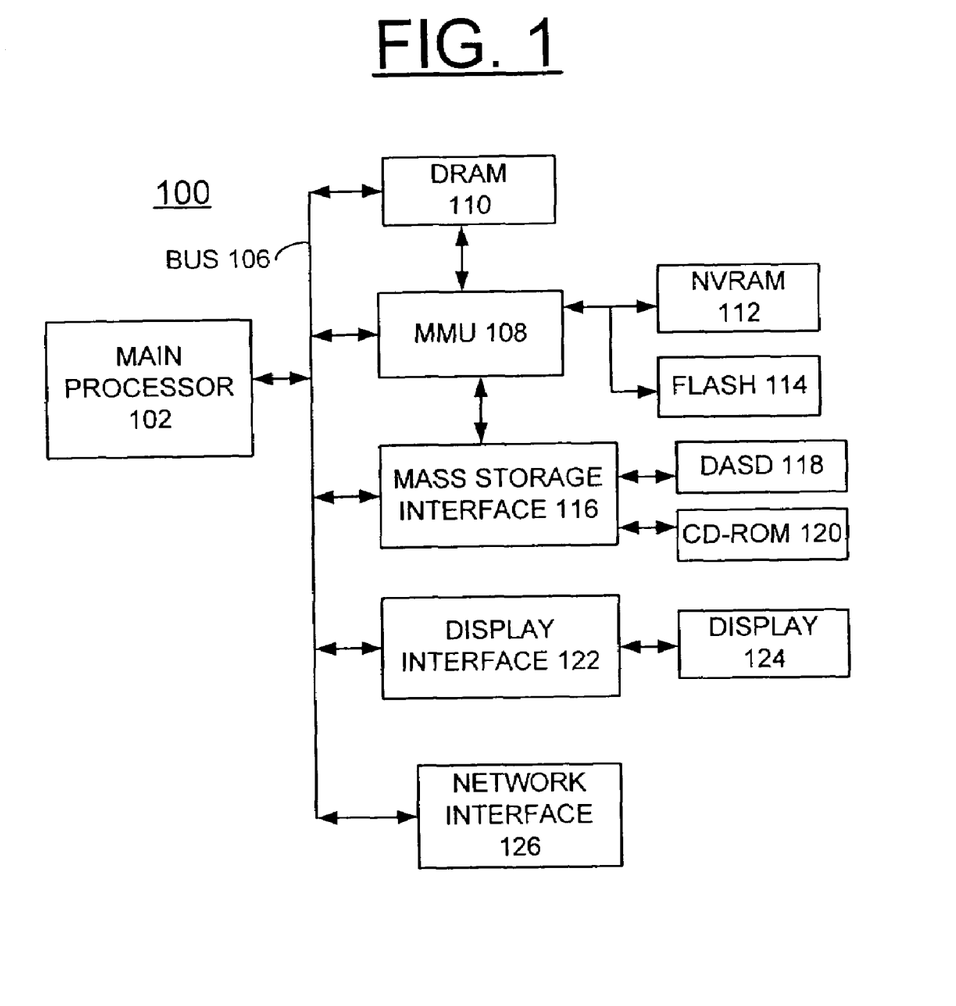
FIG. 1 is a block diagram representation illustrating a computer system for implementing autonomic testing and verification of software fix programs or program temporary fixes (PTFs) in accordance with the preferred embodiment.

Referring now to the drawings, in FIG. 1 there is shown a computer system generally designated by the reference character 100 for implementing autonomic testing and verification of software fix programs or program temporary fixes (PTFs) in accordance with the preferred embodiment. Computer system 100 includes a main processor 102 or central processor unit (CPU) 102 coupled by a system bus 106 to a memory management unit (MMU) 108 and system memory including a dynamic random access memory (DRAM) 110, a nonvolatile random access memory (NVRAM) 112, and a flash memory 114. A mass storage interface 116 coupled to the system bus 106 and MMU 108 connects a direct access storage device (DASD) 118 and a CD-ROM drive 120 to the main processor 102. Computer system 100 includes a display interface 122 connected to a display 124, and a network interface 126 coupled to the system bus 106.

Figure 2:
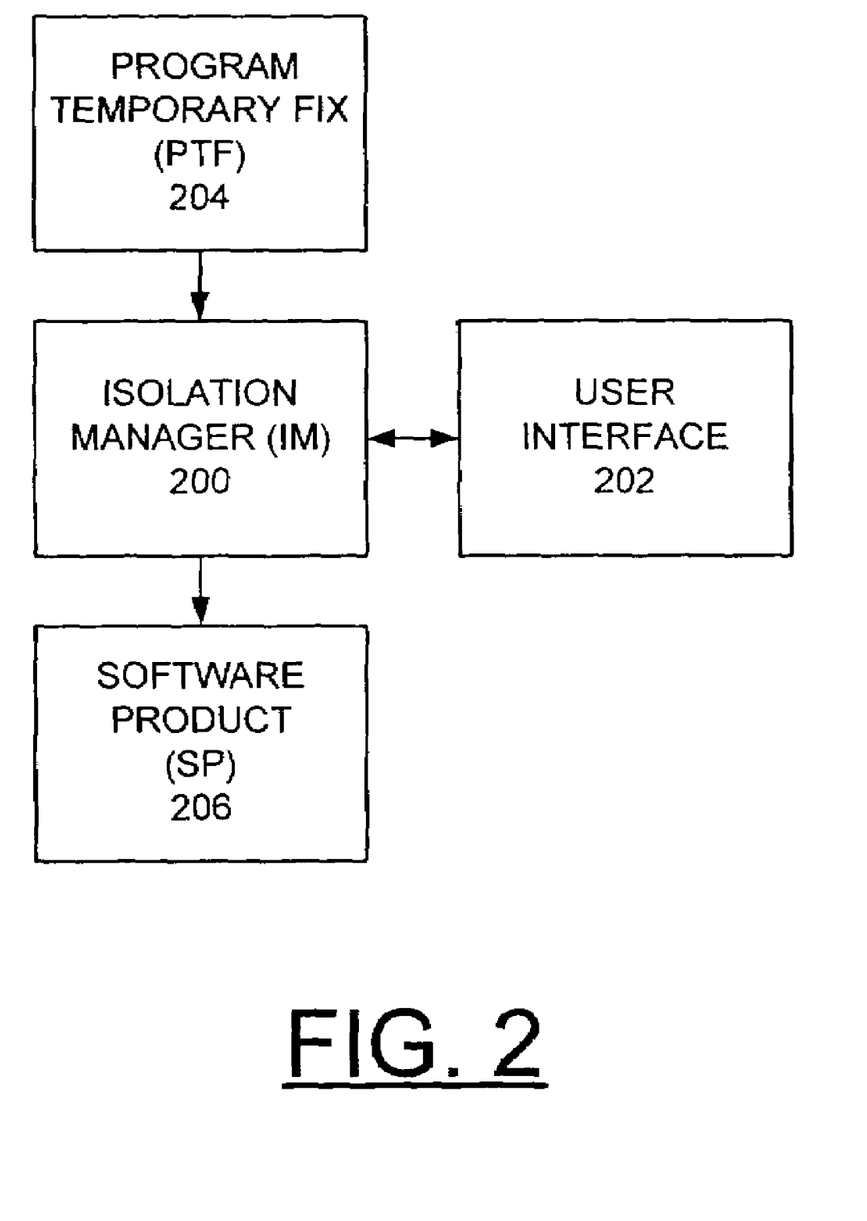
FIG. 2 illustrates an isolation manager and user interface of the computer system of FIG. 1 for implementing autonomic testing and verification of software fix programs or program temporary fixes (PTFs) in accordance with the preferred embodiment.

As shown in FIG. 2, computer system 100 includes an isolation manager (IM) 200 of the preferred embodiment, and a user interface 202. IM 200 receives a software fix program or program temporary fix (PTF) 204 to be applied to a software product (SP) 206. User interface 202 includes input of test cases into the IM 200, or alternatively user initiated test cases.

In accordance with features of one embodiment, isolation manager (IM) 200 provides an autonomic interface for autonomic testing and verification of software fix programs or program temporary fixes PTFs 204. Each software fix program or PTF 204 typically includes multiple patches or multiple program objects. IM 200 provides autonomic testing and verification of each object within a PTF 204 or a set of program temporary fixes PTFs 204 to identify a problem object. A manual assist option also is provided where the user inputs to the IM 200 the PTF 200 or set of PTFs to be isolated. IM 200 enables the user using the manual assist option to test isolated single objects and combinations of objects within the PTF 204 or set of PTFs 204 to identify a problem object.

Various commercially available computers can be used for computer system 100; for example, an iSeries computer system manufactured and sold by International Business Machines Corporation and processor 102 can be implemented, for example, by one of a line of PowerPC processors manufactured and sold by International Business Machines Corporation. Central processor unit 102 is suitably programmed to execute the flowchart of FIGS. 3A, 3B, and 3C to implement autonomic testing and verification of software fix programs or program temporary fixes (PTFs) of the preferred embodiment.

Figure 3A:
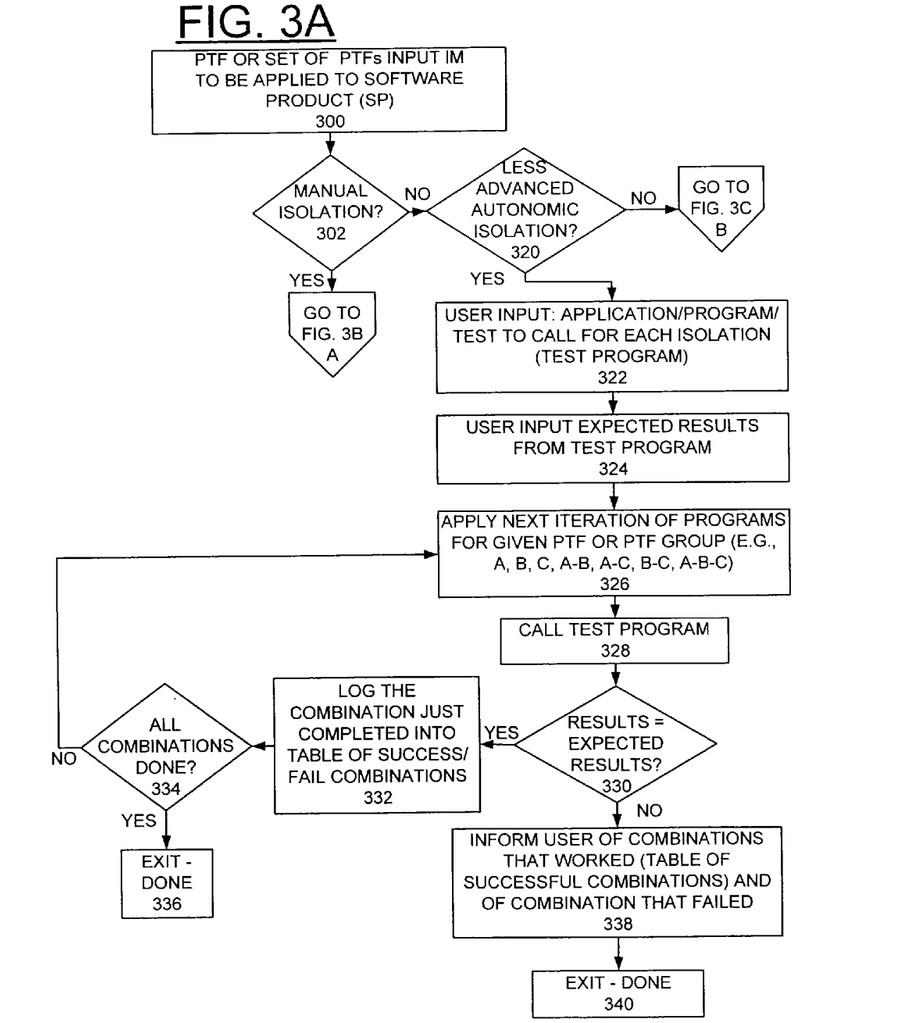
FIGS. 3A, 3B, and 3C together provide a flow chart illustrating exemplary steps for implementing autonomic testing and verification of software fix programs or program temporary fixes (PTFs) in accordance with the preferred embodiment.
Figure 3B:
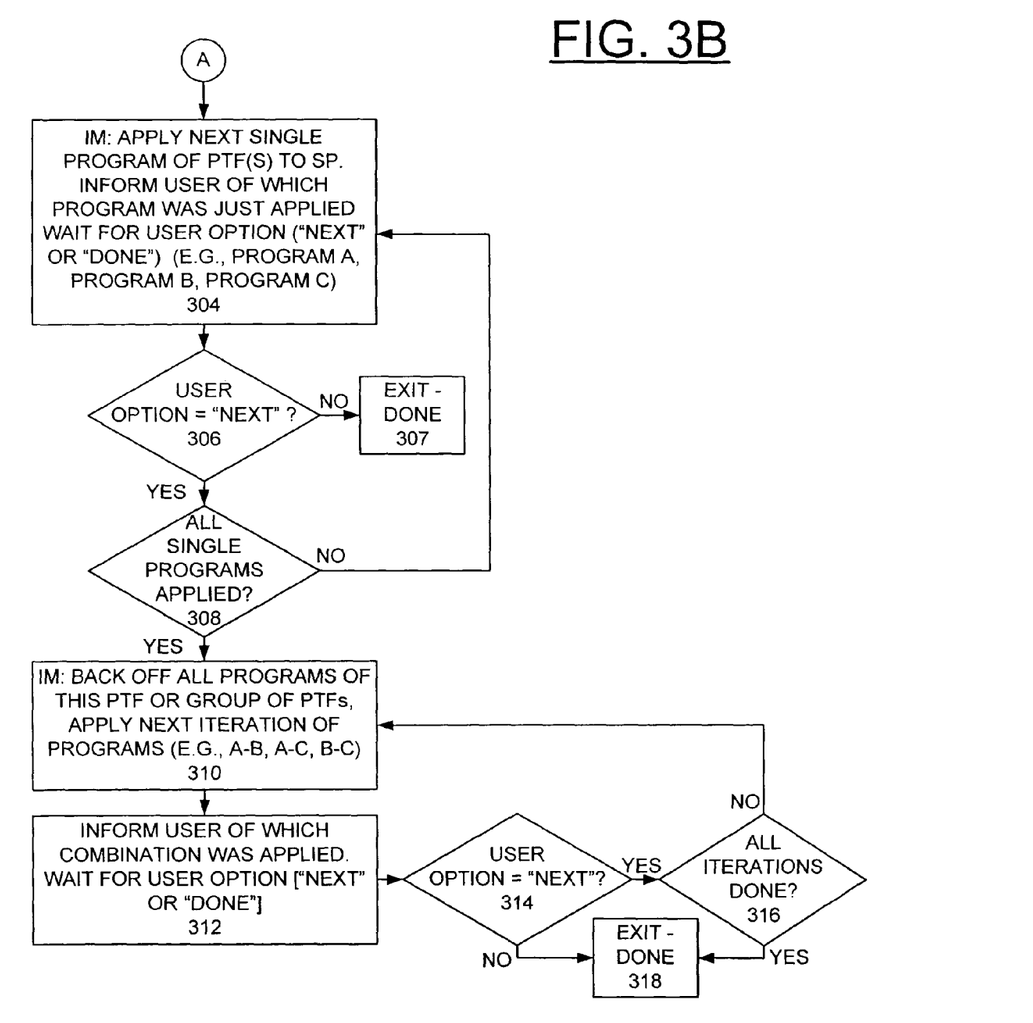

Referring now to FIGS. 3A, 3B, and 3C, there are shown exemplary steps for implementing autonomic testing and verification of software fix programs or program temporary fixes (PTFs) in accordance with the preferred embodiment. The illustrated exemplary steps are described for an example PTF 204 or a set of PTFs 204 containing a plurality of programs, referred to as programs A, B, and C. First the single PTF or a set of PTFs 204 containing programs A, B, and C is input to the IM 200 as indicated in a block 300. Checking for a user selected manual isolation option is performed as indicated in a decision block 302. When the user selected manual isolation option is identified, then the sequential steps continue following entry point A in FIG. 3B.

Referring now to FIG. 3B, there are shown exemplary steps for manually testing and isolating each program in the PTF that may be causing a problem. To isolate and test each of the programs A, B, C within the PTF 204 or set of PTFs 204, the IM 200 applies a single object or program of the PTF 204 to the SP 206 and notifies the user of which program was just applied to prompt the user to run their test with this one object isolated, and IM 200 waits for the user option next or done as indicated in a block 304. The user then tries his test, and if it failed with that single object isolated or applied, the user then knows that this object caused the problem. If the test did not fail, the user would call the IM 200 again for the next object selecting the NEXT option in the PTFs, and repeats until all objects have been isolated and/or the problem object is found. For example, IM 200 first applies program A to the SP 206, next program B, and finally program C at block 304.

In the following example, an entry point table (EPT) is defined to be a mechanism for notifying the system to call the program object or objects within the entry point table instead of the program objects of the same name that are in the operating system. Thus, an EPT is a common means known in the art for temporarily replacing a program object in the operating system. IM 200 automates program or object isolation, for example, by renaming each program or object for each PTF 204. PTFs 204 need not be applied and removed, but merely by managed placement, object by object within each PTF, via a temporary renaming of the objects within each PTF. For example, in order to isolate which object caused the problem, at block 304, each object in the PTF 204 are renamed and with the PTF 204 removed then each renamed object in the PTF 204 is selectively added to an entry point table, one at a time, first by copying each renamed object into a library, then renaming the object back to its original name, and then adding the object in that library to an entry point table and replacing that entry point table so that just this object (program) in the PTF 204 will be called during the test, and the other objects in the PTF 204 will not be called.

Checking for the user option NEXT is performed as indicated in a decision block 306. When the user option NEXT is not identified or the user option done is identified, then the manual isolation steps are done or exit as indicated in a block 307. When the user option NEXT is identified, checking whether all single programs have been applied is performed as indicated in a decision block 308. If all single programs have not been applied, then the operations return to block 304 to apply a next single program and continue. If all single programs have been applied, then the IM 200 backs off all programs of the PTF 204 or group of PTFs 204 and a next iteration of programs is applied to the SP 206. For example, the next iteration of programs sequentially applied are A-B, A-C, and B-C as indicated in a block 310. IM 200 informs the user of which combination of programs was applied and waits for the user option next or done as indicated in a block 312. Checking for the user option NEXT is performed as indicated in a decision block 314. When the user option NEXT is identified, checking whether all iterations are done is performed as indicated in a decision block 316. If not, then the sequential operations return to block 310 to apply a next iteration of programs and continue. When the user option NEXT is not identified at decision block 314 or after all iterations are done as identified at decision block 316, then the manual isolation steps are done or exit as indicated in a block 318.

Referring now to FIG. 3A, when the user selected manual isolation option is not identified at decision block 302, then checking whether less advanced autonomic isolation is selected as indicated in a decision block 320. If less advanced autonomic isolation is not selected, then the sequential steps continue following entry point B in FIG. 3C. When less advanced autonomic isolation is selected, then the user in addition to inputting to the IM 200 each PTF 204 to be isolated, also inputs the application or test program, to be called for each iteration of object isolation as indicated in a block 322. The user inputs to the IM 200 the expected results or outputs of the application as indicated in a block 324. As indicated in a block 326, the IM 200 sequentially applies iterations of the programs to the SP 206, for example, A, B, C, A-B, A-C, B-C, A-B-C. For each iteration, the test program is called as indicated in a block 328 and the results are compared with the expected results as indicated in a decision block 330. When the results equal the expected results, the isolated object or isolated combination of object for the current iteration is logged into a table of success/fail combinations as indicated in a block 332. Checking whether all combination are done is performed as indicated in a decision block 334. When all combinations are done, then the autonomic isolation steps are done or exit as indicated in a block 336. When the outputs of the application do not agree with the expected output for a given isolation, IM 200 informs the user of combinations that worked and returns that isolated object or combination of objects for the iteration and its PTF 204 as the cause of the problem as indicated in a block 338. In addition, the IM 200 may also inform the user of the most simple combination that produced the incorrect result. For example, suppose that A-B caused the failure as well as A-B-C. Then report A-B as the cause. This way, the user would know that the combination with C (A-B-C) that failed was not due to C but was due to A-B. Then the autonomic isolation steps are done or exit as indicated in a block 340.

In accordance with features of the preferred embodiment, the isolation manager (IM) 200 provides another more advanced autonomic isolation. This more advanced automation is applied where the user inputs to the IM 200 the PTFs 204 to be isolated and the application or test program to call, but does not give the expected outputs. In this case, the IM 200 reports to the user the outputs for each isolation. The IM 200 compares the outputs for each isolation and identifies one isolation that is not consistent with outputs of each other isolation when running the exact same test on each isolation. The IM reports to the user the unique result difference as the iteration that caused the incorrect output.

Figure 3C:
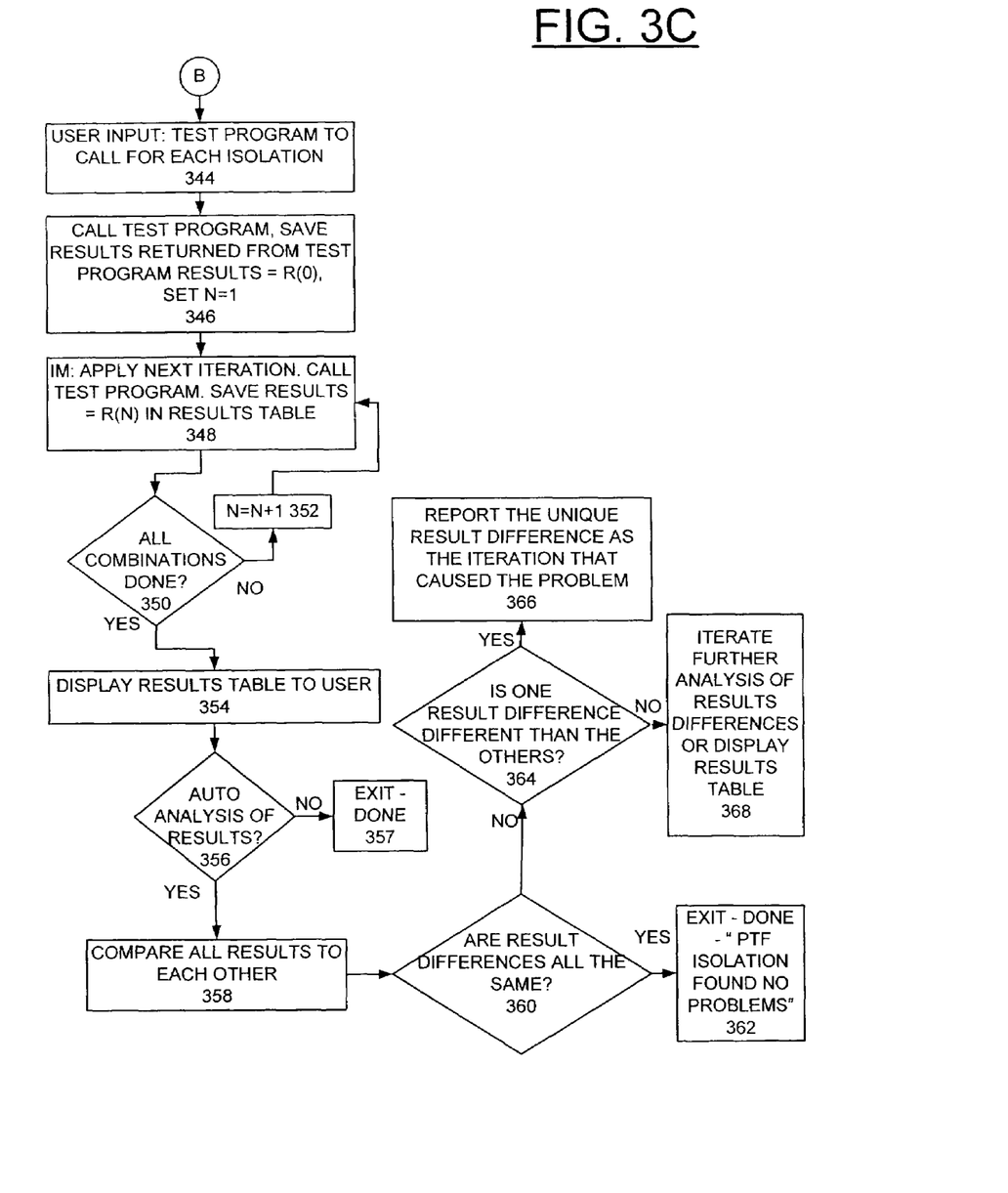

Referring now to FIG. 3C, when the user selected less advanced autonomic isolation option is not identified at decision block 320, then the more advanced autonomic isolation is performed. Then the user in addition to inputting to the IM 200 each PTF 204 to be isolated at block 300 in FIG. 3A, also inputs the application or test program, to be called for each iteration of object isolation as indicated in a block 344. The IM 200 calls the test program and saves results returned from the test program as R(0) in a results table and sets a results index N to 1. Then IM 200 sequentially applies iterations of the programs to the SP 206, for example, A, B, C, A-B, A-C, B-C, A-B-C. For each iteration, the test program is called and the results are stored as indicated in a block 348. Checking for all combinations being processed is performed as indicated in a decision block 350. If not, N is incremented as indicated in a block 352 and a next iteration is applied returning to block 348. When all combinations are done, then the results table is displayed to the user as indicated in a block 354. Then checking for a user selected auto analysis of the results is performed as indicated in a decision block 356. If not selected, then the sequential steps of the more advanced autonomic isolation are done and exit as indicated in a block 357.

When the user selected auto analysis of the results is identified, then each of the results R(0)-R(N) are compared to each other result as indicated in a block 358. Checking to determine whether all result differences are all the same is performed, such as, result R(0)-R(1), R(0)-R(2), . . . R(0)-R(N), as indicated in a decision block 360. If all result differences are all the same, then the sequential steps of the more advanced autonomic isolation are done and exit, notifying the user that the PTF isolation found no problems as indicated in a block 362. If all result differences are not all the same, then checking whether one result difference is different than the others is performed as indicated in a decision block 364. If one result difference is different than the others, such as, results R(0)-R(1), R(0)-R(2), R(0)-R(3), are the same, but R(0)-R(4) is different, then the unique result difference is reported to the user as the iteration that caused the problem as indicated in a block 366. Otherwise, further analysis iteration may be performed or the results table may be displayed to the user as indicated in a block 368.

Once a problem object has been isolated, it can be autonomically backed out by renaming the last version of the object that was good before the PTF was applied. If there are co-requisites and superseded PTFs associated with the PTF of this object, then all associated objects of the affected PTFs can also be autonomically backed out in the same manner, or the bad PTF can be removed. When the bad object is isolated and detected, a notification can be autonomically sent to the customer support team indicating the PTF number that had the problem as well as the object within the PTF that caused the problem.

Often a PTF will have a co-requisite requirement, that is, to have another PTF applied so that they must be applied together, or a pre-requisite requirement, for another PTF to be applied before a given PTF is applied. For the pre-requisite case, the isolation can be done for the pre-requisites first, since they do not have dependencies on the later PTFs, and this is straightforward. Co-requisites objects are isolated as a group.

In accordance with features of the preferred embodiment, the isolation manager (IM) 200 advantageously is used for group testing environments where scores of test cases are run when a group PTF is applied on a test machine. A group PTF is a set of PTFs that are sent to a customer and applied as a set as if they were one fix. In these environments, the expected test case outputs are very controlled. If a test case fails after a group PTF is applied, the IM 200 can be called with the given test case, with the expected outputs, and the list of PTFs, and the IM 200 then isolates the PTF and the object within the PTF that caused the unexpected output.

Figure 4:
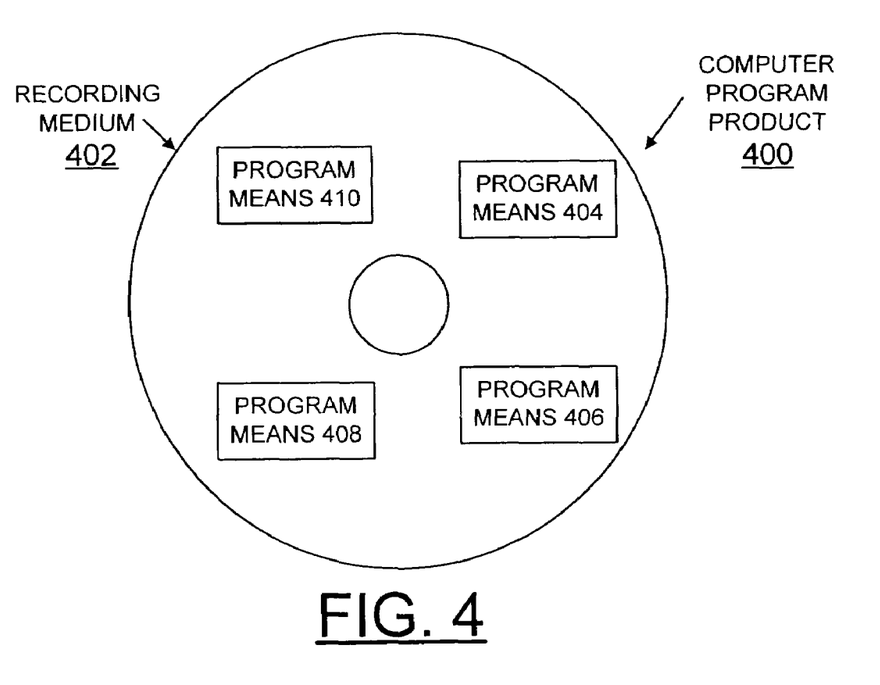
FIG. 4 is a block diagram illustrating a computer program product in accordance with the preferred embodiment.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, a transmission type media such as a digital or analog communications link, or a similar computer program product. Recording medium 402 stores program means 404, 406, 408, 410 on the medium 402 for carrying out the methods for implementing autonomic testing and verification of software fix programs or program temporary fixes of the preferred embodiment in the system 100 of FIG. 1.

A sequence of program instructions or a logical assembly of one or more interrelated modules defined by the recorded program means 404, 406, 408, 410, direct the computer system 100 for implementing autonomic testing and verification of program temporary fixes (PTFs) of the preferred embodiment.

While the present invention has been described with reference to the details of the embodiments of the invention shown in the drawing, these details are not intended to limit the scope of the invention as claimed in the appended claims.

What is claimed is:

1. A method for implementing autonomic testing and verification of software fix programs comprising the steps of:
   receiving a software fix program; said software fix program including multiple patches;
   sequentially applying each patch of said multiple patches of said software fix program to a software product;
   testing said software product responsive to each said sequentially applied patch;
   providing test results to a user responsive to said testing of said software product;
   sequentially applying iterations of each patch of said multiple patches of said software fix program to a software product and different combinations of said patches to the software product;
   calling a test program and receiving expected test results for each applied iteration to the software product;
   testing said software product for each applied iteration to the software product; and comparing test results to the expected test results for each applied iteration to the software product; and
   saving test results for each applied iteration to the software product and displaying said test results to the user.

2. A method for implementing autonomic testing and verification of software fix programs as recited in claim 1 wherein said software fix program includes a program temporary fix (PTF); said PTF including multiple patches or programs.

3. A method for implementing autonomic testing and verification of software fix programs as recited in claim 2 includes the step of providing an isolation manager for receiving said PTF and for sequentially applying each patch or program of said multiple patches or programs of said PTF to said software product.

4. A method for implementing autonomic testing and verification of software fix programs as recited in claim 3 includes the step of providing a user interface coupled to said isolation manager for receiving user input selections and reporting results to the user.

5. A method for implementing autonomic testing and verification of software fix programs as recited in claim 2 wherein the step of receiving said software fix program including said program temporary fix (PTF) includes receiving a set of PTFs, each said PTF containing multiple patches or programs; and wherein each patch or program contained in said group of PTFs is sequentially applied to said software product.

6. A method for implementing autonomic testing and verification of software fix programs as recited in claim 2 includes providing an isolation manager for receiving said software fix program including said program temporary fix (PTF) and for sequentially applying each patch or program of said multiple patches or programs of said software fix program or said program temporary fix (PTF) to said software product; and wherein said isolation manager, responsive to a manual isolation user option, applies a patch or program of the multiple patches or programs of said software fix program or said program temporary fix (PTF) to said software product, notifies the user of said patch or program applied to said software product, and waits for a user option of next or done.

7. A method for implementing autonomic testing and verification of software fix programs as recited in claim 6 wherein said isolation manager, responsive to receiving said next user option, applies a next patch or a next program of the multiple programs of said software fix program or said program temporary fix (PTF) to a software product, notifies the user of the next patch or next program applied to the software product, and waits for a user option of next or done.

8. A method for implementing autonomic testing and verification of software fix programs as recited in claim 2 includes providing an isolation manager for receiving said software fix program including said program temporary fix (PTF) and for sequentially applying each patch or program of said multiple patches or programs of said software fix program or said program temporary fix (PTF) to said software product; and wherein said test program and said expected test results are input to the isolation manager; said isolation manager sequentially applies iterations of each patch or program of the multiple patches or programs of said software fix program or said program temporary fix (PTF) and different combinations of the patches or programs to the software product and calls said test program for each applied iteration to the software product.

9. A method for implementing autonomic testing and verification of software fix programs as recited in claim 8 wherein said isolation manager compares test results with the expected test results for each applied iteration and notifies the user when the test results are different from the expected test results.

10. A method for implementing autonomic testing and verification of software fix programs as recited in claim 2 includes providing an isolation manager for receiving said software fix program including said program temporary fix (PTF) and for sequentially applying each patch or program of said multiple patches or programs of said software fix program or said program temporary fix (PTF) to said software product; and wherein said test program is input to the isolation manager; said isolation manager sequentially applies iterations of each patch or program of the multiple patches or programs of said software fix program or said program temporary fix (PTF) and different combinations of said patches or programs to the software product and calls the test program for each applied iteration to the software product.

11. A method for implementing autonomic testing and verification of software fix programs as recited in claim 10 wherein said isolation manager saves test results in a results table for each applied iteration to the software product and displays said test results to the user.

12. A method for implementing autonomic testing and verification of software fix programs as recited in claim 11 wherein said isolation manager compares all test results to each other test result to identify a problem patch or program.

13. Apparatus for implementing autonomic testing and verification of software fix programs comprising:
   an isolation manager receiving a software fix program containing a plurality of patches;
   a user interface coupled to said isolation manager receiving user input selections and reporting results to a user;
   said isolation manager sequentially applying each patch of said plurality of patches to a software product; and testing said software product responsive to each said sequentially applied program; and providing test results to a user responsive to said testing of said software product; and
   said isolation manager sequentially applying iterations of each patch of said multiple patches of said software fix program to the software product and different combinations of said patches to the software product; calling a test program and receiving expected test results for each applied iteration to the software product; testing said software product for each applied iteration to the software product; and comparing test results to the expected test results for each applied iteration to the software product; and saving test results for each applied iteration to the software product and displaying said test results to the user.

14. Apparatus for implementing autonomic testing and verification of software fix programs as recited in claim 13 wherein said software fix programs include multiple program temporary fixes (PTFs); each PTF containing a plurality of programs; and wherein said isolation manager is responsive to receiving a set of PTFs, for sequentially applying each program contained in said set of PTFs to said software product, and for testing said software product responsive to each said sequentially applied program.

15. Apparatus for implementing autonomic testing and verification of software fix programs as recited in claim 13 wherein said software fix programs include multiple program temporary fixes (PTFs); each PTF containing a plurality of programs; and wherein said isolation manager is responsive to a manual isolation user option, for applying a program of the multiple programs of the PTF to said software product, for notifying the user of the program applied to said software product, and for waiting for a user option of next or done.

16. Apparatus for implementing autonomic testing and verification of software fix programs as recited in claim 15 wherein said software fix programs include multiple program temporary fixes (PTFs); each PTF containing a plurality of programs; and wherein said isolation manager is responsive to receiving said next user option for applying a next program of the multiple programs of the PTF to said software product, for notifying the user of the next program applied to the software product, and for waiting for a user option of next or done.

17. Apparatus for implementing autonomic testing and verification of software fix programs as recited in claim 13 wherein said software fix programs include multiple program temporary fixes (PTFs); each PTF containing a plurality of programs; and wherein said isolation manager is responsive to receiving a test program; for sequentially applying iterations of each program of the multiple programs of the PTF and different combinations of the programs to the software product and for calling said test program for each applied iteration to the software product.

18. Apparatus for implementing autonomic testing and verification of software fix programs as recited in claim 17 wherein said isolation manager is responsive to receiving expected test results for comparing test results with said expected test results for each applied iteration and for notifying the user when said test results are different from said expected test results.

19. Apparatus for implementing autonomic testing and verification of software fix programs as recited in claim 17 wherein said isolation manager is adapted for saving test results in a results table for each applied iteration to the software product and for displaying said test results to the user.

20. Apparatus for implementing autonomic testing and verification of software fix programs as recited in claim 19 wherein said isolation manager is adapted for comparing all test results to each other test result to identify a problem program.

21. A computer program product for implementing autonomic testing and verification of software fix programs in a computer system, said computer program product including a plurality of computer executable instructions stored on a computer recording medium consisting one of a floppy disk, a high capacity read only memory in the form of an optically read compact disk or CD-ROM, and a tape, wherein said instructions, when executed by the computer system cause the computer system to perform the steps of:
   receiving a software fix program, said software fix program including multiple patches;
   sequentially applying each patch of said multiple patches of said software fix program to a software product;
   testing said software product responsive to each said sequentially applied patch;
   providing test results to a user responsive to said testing of said software product;
   sequentially applying iterations of each patch of said multiple patches of said software fix program to a software product and different combinations of said patches to the software product;
   calling a test program and receiving expected test results for each applied iteration to the software product;
   testing said software product for each applied iteration to the software product; and comparing test results to the expected test results for each applied iteration to the software product; and
   saving test results for each applied iteration to the software product and displaying said test results to the user.

* * * * *